United States Patent

Quayle et al.

[15] 3,664,306

[45] May 23, 1972

[54] APPARATUS FOR THE DETECTION OF MASTITIS IN MILK ANIMALS

[72] Inventors: Joshua Creer Quayle, Teesside; Graham Roland Greatrix, Seaton Carew, both of England; Ronald Alan Coombe, Bentley, Australia

[73] Assignee: National Research Development Corporation, London, England

[22] Filed: Oct. 23, 1969

[21] Appl. No.: 868,841

[52] U.S. Cl...............................119/14.14, 73/194, 324/30
[51] Int. Cl..........................................A01j 3/00, A01j 5/00
[58] Field of Search......................119/14.14, 14.15; 324/30; 73/194

[56] References Cited

UNITED STATES PATENTS

| | | | |
|---|---|---|---|
| 2,837,271 | 6/1958 | Haglund | 324/30 X |
| 2,898,549 | 8/1959 | Miller | 119/14.15 X |
| 3,374,672 | 3/1968 | Horne | 324/30 B |
| 3,474,330 | 10/1969 | Dauphinee | 324/30 |
| 3,512,080 | 5/1970 | Hanson | 324/30 |

FOREIGN PATENTS OR APPLICATIONS

| | | | |
|---|---|---|---|
| 610,545 | 10/1948 | Great Britain | 324/30 |
| 650,199 | 2/1951 | Great Britain | 119/14.15 |
| 1,002,416 | 8/1965 | Great Britain | 324/30 B |

OTHER PUBLICATIONS

G. R. Greatrix, J. C. Quayle and R. A. Coombe, " Detection of Abnormal Milk by Electrical Means," J. Dairy Report 1968, [35–213] pages 213– 221.

Dairy Industries, " Rapid Abnormality Indicator," Jan. 1947, pages 35– 40 & 48, by J. G. Davis.

The Veternary Record, Apr. 13, 1968, pages 431– 433 " Electrical Conductivity and the Leucocyte Count of Bovine Milk," BY T. W. A. Little, C. N. Forbes, and D. Forbes.

*Primary Examiner*—Aldrich F. Medbery
*Attorney*—Cushman, Darby & Cushman

[57] ABSTRACT

A method and apparatus are described for detecting mastitis in milk animals. Milk from different teats of the animal is passed through conductivity cells and if the conductance of the milk from one teat is different from that of milk from other teats a mastitis infection is likely. A convenient method of comparing conductances using an electrical bridge is described, as is a suitable conductivity cell.

5 Claims, 4 Drawing Figures

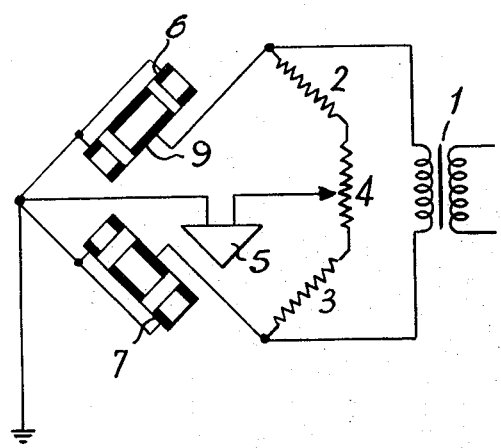
Fig. 1.
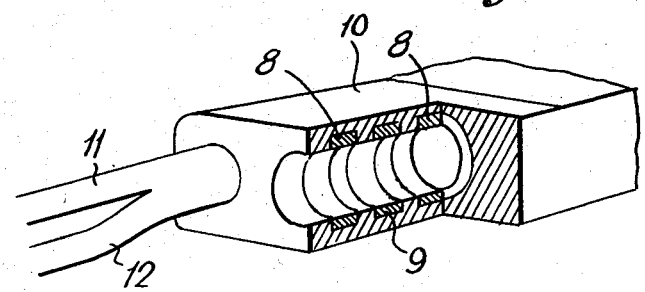
Fig. 2.
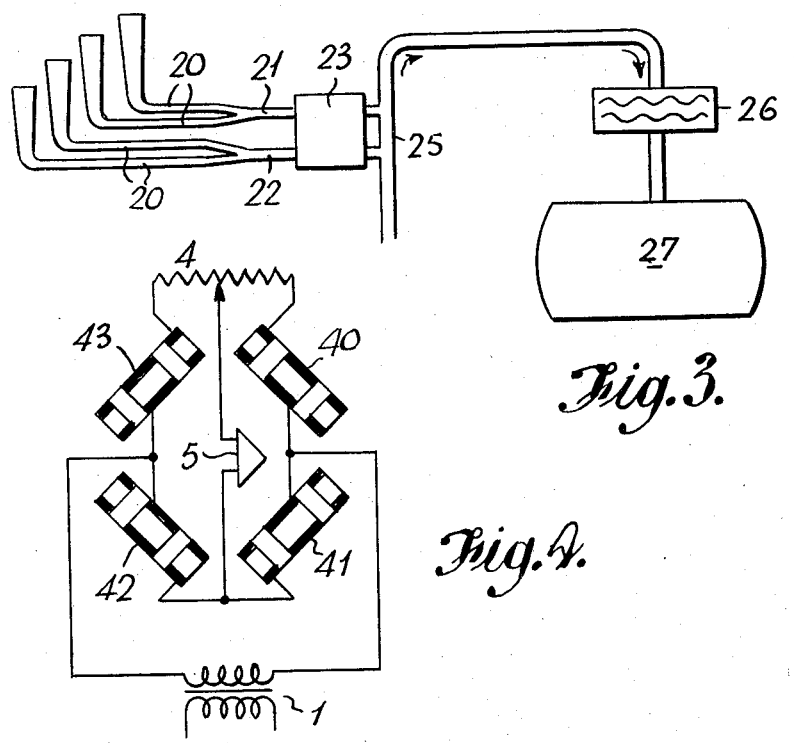
Fig. 3.
Fig. 4.

APPARATUS FOR THE DETECTION OF MASTITIS IN MILK ANIMALS

The present invention relates to the comparison of the conductivities of liquid samples, and particularly the detection by such comparison of mastitis in cows at a stage early enough to prevent the infection of other cows, lasting damage to the udder, and reduction in milk yield.

Mastitis is a disease of the udder, which infects milk animals such as cows, sheep and goats and causes serious losses of milk production. It almost invariably appears in one quarter of the udder at first, so that only the milk from the corresponding teat is infected, and spreads progressively to the rest of the udder later.

Many changes in the characteristics of the milk occur when mastitis infects a cow, e.g. the chloride content of the milk, its pH, its conductivity, its opacity, its viscosity, and so on. The cost of equipment to measure these various parameters varies very widely, likewise the robustness, the ease of keeping the working parts clean and sterile, the ease of comprehending the indication presented, and in consequence the suitability for use in farming and veterinary practice.

Small changes in conductivity occur during the early stages of the disease before it becomes sufficiently acute to affect the condition and milk yield of the cow, or the suitability of the milk for sale. There are many other factors which cause parallel changes in the conductivity, such factors as diet, condition of the cow, temperature of the milk when tested, season of the year, and so on. Nevertheless, a definite correlation has been found between conductivity, permittivity and permeability and the progress of infection, but there is a wide spread of values, due to the perturbations that the other factors introduce.

According to a first aspect of the present invention there is provided a method of detecting mastitis in milk animals having at least two operative teats, including obtaining electrical signals dependent on the conductivity of samples of milk from at least two different teats of a milk animal and comparing the signals to detect any differences in the conductivity of the samples.

According to a second aspect of the present invention there is provided apparatus for comparing the conductivities of milk samples, including at least two sensing means, each adapted to allow milk from a different teat of a milk animal to flow therethrough during milking and each sensitive to the conductivity of the milk sample therein, and differential measuring means coupled to the sensing means for detecting any differences in the conductivity of the samples.

By comparing the conductivities of milk from teats of the same animal the effects of the perturbations mentioned above are largely removed.

Each sensing means may include a conductivity cell adapted to receive a stream of milk from one or two quarters of a cow's udder. The conductivity cell preferably includes at least two electrodes insulated from one another and the cell may have a cylindrical passageway for milk, whose interior surface is partly constituted by cylindrical electrodes.

Comparing conductivities presents several problems. For example, inaccurate results will be obtained if ineffective cleansing leaves coatings of fat or milk stone on the electrodes of conductivity cells forming part of the comparison apparatus. Uniting the electrodes to the surrounding molding without leaving crevices in which bacteria and solid deposits can lodge is difficult and tends to make conductivity cells fairly expensive.

To avoid crevices the insulating material is molded around the electrodes which are assembled beforehand on a cylindrical mandrel.

Certain embodiments of the invention will now be described, by way of example, with reference to the accompanying drawings, in which:

FIG. 1 is a circuit diagram of an embodiment of the second aspect of the present invention, FIG. 2 is a perspective view, part cut away, of a conductivity cell used in the circuit of FIG. 1, FIG. 3 is a schematic diagram showing how the conductivity cell of FIG. 2 is connected in milking apparatus, and FIG. 4 is a circuit diagram of a further embodiment of the second aspect of the present invention.

In FIG. 1 a bridge having two ratio arms and two milk conduction arms is shown for comparing the conductivities of milk streams. The bridge is fed from a transformer 1 with alternating current of a suitable voltage and frequency, and the two ratio arms 2 and 3 have a balancing potentiometer 4. The detection device is an amplifier 5, and the two other arms of the bridge are composed of two cells 6 and 7. The milk from a pair of teats from a cow flows through the cell 6 and from the other pair through the cell 7. Each cell consists of a pair of electrodes 8 separated by an insulator from a central electrode 9, and as the milk flows through the cells, the conductivity of the flow is continuously measured by the bridge. Any appreciable departure from equality of conductivity of the milk is detected by the resulting unbalance of the bridge.

FIG. 2 shows a twin cell assembly for receiving the milk from a pair of teats of a cow. The cell consists of a housing 10 of plastics material with a double inlet from two pipes 11, 12, the pipes each being connected to the normal form of teat cup. There is a single pipe to which the two pipes 11 and 12 connect, and this pipe is coupled to the interior of the housing 10 through which the milk flows. The electrodes 8 are joined together, and the electrode 9 is located between the two electrodes 8 and insulated from them. When in use, current flows from the central electrode to the other two electrodes or vice versa, and the bridge circuit of FIG. 1 continuously evaluates the conductivity ratios of the milk streams. The outlet of the housing 10 tilts upwards so as to maintain the bore of the housing continuously filled with milk.

FIG. 3 shows how the conductivity cell is coupled in milking equipment. In FIG. 3 four teat cups 20 are connected in pairs to the pipes 21 and 22 connected to a twin cell 23. Thereafter the milk may either pass to an individual receptacle (not shown) or to a common gathering pipe line 25 in which case the milk then passes through a cooler 26 to a storage tank and aspirator 27.

This arrangement described is very simple to operate and requires no technical skill on the part of an attendant. Since however, it detects the onset of mastitis in a particular cow, and since it may be required to know which particular teat is affected, the invention can be made to operate with a bridge circuit having a single conductivity cell, containing milk flowing from one teat only, in each arm as shown in FIG. 4. In this bridge the transformer 1 is connected to ratio arms made up of cells 40, 41, 42 and 43 each cell being filled with milk. A balancing potentiometer 4 is provided, and by deduction from the output of the bridge by way of the amplifier 5, it can be determined which arm of the bridge has an unusually low resistance. If necessary, milk flow to two of the teats may be reversed in order to check that if this reversal produces no different bridge divergence i.e. no change in output of the amplifier then it is the other pair of teats which is effected. The direction of divergence of the amplifier, either up or down, indicates which of the teats finally is affected.

It is found in practice that the foaming tendency of fresh milk causes inaccuracies if foam enters one or more of the measuring cells. To overcome this difficulty each cell may be made in the form of a U-tube with the entry for the milk in one leg of the tube. As the milk enters, and passes downwardly through one leg of the tube, the foam tends to float towards the top of this leg The foam-free milk passes through to the other side of the U-tube when it departs to a common header or receptacle. There is a small bore pipe communicating between the top of the down leg of the tube and the header so as to withdraw air rising in the down pipe. The measuring cells inserted in the arms of the bridge, are placed in the up pipes where foam-free milk is present.

Where it is found that the four-cell bridge method of detection is not easy to apply in practice then a single cell bridge may be employed each of the teats being connected to the single cell in sequence, the teat giving the lowest reading being the one which is most likely to be diseased. Since, however, the balancing of a bridge of this kind and connection of the various teats to it in sequence involves some manual skill and interpretation of the readings, this arrangement would probably be more suitable for operation by a veterinary surgeon than by farmers.

We claim:

1. Apparatus for comparing the electrical conductivities of milk samples taken as the cow is being milked, including at least two sensing means, each allowing milk from a different teat of a milk animal to flow continuously therethrough during milking and each sensitive to the electrical conductivity of the milk sample therein, a four-arm electrical bridge in which each of at least two of the arms include one of the sensing means which receive the milk, and means for sensing imbalance in the bridge as an indication of the relative conductivities of the milk flowing from the different teats.

2. Apparatus according to claim 1, further including tube means for separately coupling teats of the udder of a cow individually to the sensing means, and means for aspirating milk from the udder through the sensing means.

3. Apparatus for the detection of mastitis in cows comprising a separate attachment and pipe for each of the four teats of a cow, four electrical conductivity means whose electrical conductance varies in accordance with the electrical conductivity of milk therein, means for aspirating milk from each teat to flow continuously through the respective one of said electrical conductivity means particular thereto, a four-arm electrical bridge in which each bridge arm includes a respective one of the electrical conductivity means, and means for sensing imbalance in the bridge as an indication of the relative conductivities of the milk flowing through the respective electrical conductivity means from the four teats.

4. Apparatus as claimed in claim 3, in which each electrode assembly comprises a body portion of plastics material, defining a smooth-interiored cavity, with electrodes of conducting, non-electrolizable material in the wall of said cavity.

5. Apparatus as claimed in claim 4 wherein the cavity is of U-tube formation the milk entering one leg of the U and its conductivity being measured in the other leg.

* * * * *